Feb. 12, 1929. H. W. CARLOUGH Re. 17,213

HAIR WAVING PAD

Original Filed June 28, 1926

INVENTOR
Howard W. Carlough
BY
Warren S. Orton
ATTORNEY

Reissued Feb. 12, 1929. Re. 17,213

UNITED STATES PATENT OFFICE.

HOWARD W. CARLOUGH, OF NEW YORK, N. Y., ASSIGNOR TO KEEN WAVING COMPANY, INCORPORATED, OF NEW YORK, N. Y., A CORPORATION OF NEW YORK.

HAIR-WAVING PAD.

Original No. 1,653,841, dated December 27, 1927, Serial No. 118,946, filed June 28, 1926. Application for reissue filed December 27, 1928. Serial No. 328,674.

The invention relates in general to an improved form of combination pad for use in treating and protecting the hair while practising the art of permanent hair waving, which pads are commonly known as steam pads and the invention also relates to a method for using such pads.

In the art of permanent hair waving on a person's head, it is a usual practise to wrap a strand of hair A on a rod B; to protect the coiled hair with certain substances usually a mixture of saline powders hereinafter referred to as a hair treating material and which material is most conveniently contained in a prepared pad known as a steam pad. The coil of hair thus protected by the steam pad is wetted, inserted in a tubular electric heater and subjected to a steaming process. In accordance with the present practise, it is usual to wet the pad containing the hair treating material but difficulty has been experienced in preventing drippings from passing out of the heater and as these drippings become quite hot as the waving operation progresses there is danger of burning the head of the person whose hair is being waved.

The primary object of the invention is to provide a form of steam pad which will have all of the advantages inherent in similar structures now on the market in that it can be formed as an envelope containing a layer of material saturated with the hair treating substance and which will have the additional advantage of preventing drippings from the wetted material or incidental steam condensates from passing out of the heater on to the scalp of the person.

Broadly, this object is attained, first by providing a booklike form of pad arranged so that the cover sheet, which subsequently forms the envelop, can be held out of the water or lotion used for wetting the interior material containing sheet and, second, by the positioning of an absorbent pad or layer at the end of the pad which when in position forms the end part of the tube disposed adjacent the person's head.

Various other objects and advantages of the invention will be obvious from a consideration of the preferred method of practising the invention hereinafter described and from an inspection of the accompanying drawings and in part will be more fully set forth in the following particular description of one method and of one form of apparatus for practising the method and the invention also consists in certain new and novel operations and features of construction and combination of parts hereinafter set forth and claimed.

In the following description and in the claims, parts will be identified by specific names for convenience of expression but they are intended to be as generic in their application to similar parts as the art will permit.

Figure 1:
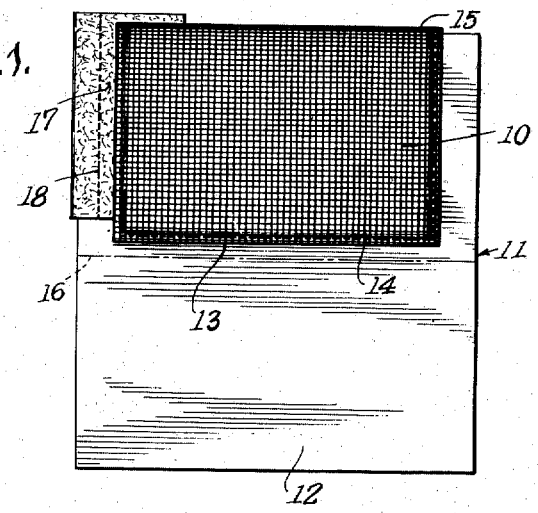
Fig. 1 is a plan view looking down upon a pad constituting a preferred embodiment of the invention in the normal open position in which such pads are packed for shipping and storing.
Figure 2:
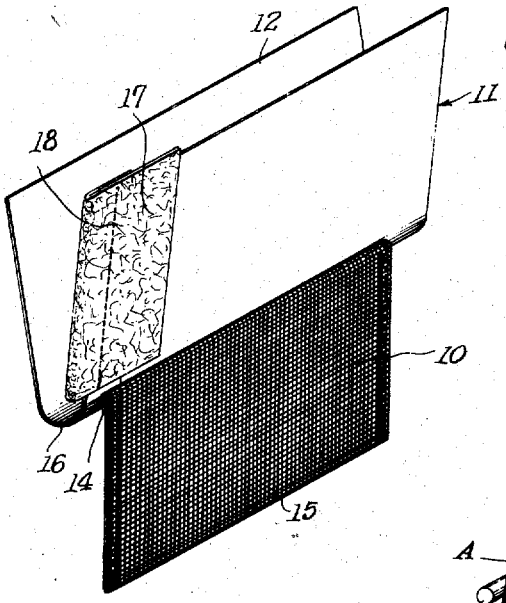
Fig. 2 is a view in perspective of the pad as it is held in position to wet the interior sheet constituting the hair treating material sheet.
Figure 3:
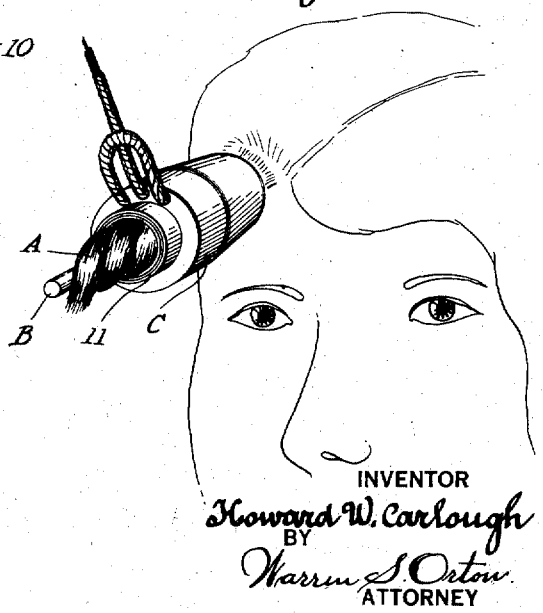
Fig. 3 is a perspective view with the pad in use on a coil of hair and with parts of the tube formed of the pad shown in Figs. 1 and 2 broken away to show the rolled construction.

The pad as particularly shown in Figs. 1 and 2 comprises one or more flexible layers of material, preferably cotton, assembled into a sheet 10 and impregnated with or containing compositions for treating the hair and which structure is of conventional and well known character. Positioned on one side of the sheet 10 when in the flat position shown in Fig. 1 is a rectangular sheet of paper 11, approximately twice the size of the area of the sheet 10 so as to provide an extension or flap 12 projecting beyond one of the edges 13 of the sheet 10. The structure herein disclosed distinguishes from similar structures in that the sheet 10 is secured to the paper sheet 11 along the edge 13 preferably by means of a line of stitching 14 and leaving the opposite edge 15 of the sheet 10 free to swing away from the paper sheet as particularly shown in Fig. 2. In this way, the paper sheet can be bent backwardly away from the sheet 10 and along a medial line 16 thus permitting the dipping of the sheet 10 into a bowl of water or other liquid without soaking the paper envelop forming part. When wetted the paper sheet 11 is bent in reverse direction along the line 16 and into engagement with the wetted sheet 10 to form a pad resembling conventional forms of such structures except that the outer paper envelop is not intentionally wetted before the pad is rolled into tubular form about the hair coil A.

Secured along the side of the paper to which the sheet 10 is secured is a strip of absorbent material preferably cotton flannel 17. This is secured by means of a line of stitching 18 and is preferably disposed so as to extend slightly beyond the adjacent edge of the paper. It will be noted that in wetting the sheet 10, the absorbent layer 17, was held out of engagement with the wetting material and in this way the dry absorbent flap 17 is available and in condition to receive any surplus drip which may pass off the sheet 10 when the device is in use. It is herein suggested that the absorbent material 17 and the sheet 10 be designed and positioned so that they overlap for a short distance when in use. This arrangement has a tendency to dry the sheet 10 along the edge 19 when in engagement with the absorbent material 17 as particularly shown in Fig. 1.

The pad thus disclosed and with the flap 12 engaging the adjacent side of the wetted sheet 10 is wrapped about the coiled hair A as is usual in the use of such pads except that care is taken that the end provided with absorbent material 17 be disposed adjacent the head of the person whose hair is being waved. When so positioned, a heater C is positioned on the tube formed by the pad and the hair waving operation is performed as is usual in this art.

By means of a device of the class described, it is possible to thoroughly saturate the part of the pad which contains the hair treating material without soaking the paper envelop with resulting possibility of it deteriorating or tearing when an attempt is made to wrap it about the coil of hair. When in position, the absorbent layer at the end of the tube has been found to be a sufficient insurance against possibility of drippings leaking off of the end of the pad adjacent the person's head and there has thus been eliminated the possibility of accidentally burning the head of the person under treatment.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. A pad for use in covering a coil of hair in practising the art of permanent hair waving comprising a sheet of paper adapted to be folded along a central line to form opposite sides of an envelope, a layer of hair protecting material hingedly secured along one edge to the sheet of paper and along a line parallel to and adjacent said folding central line thereby to form in effect a book of three sheets comprising two outer paper sheets and an intermediate sheet.

2. A pad for use in permanent hair waving comprising an outer sheet, a layer of hair treating material secured along one edge to the sheet and otherwise free to swing away from the same, whereby the layer may be wetted without wetting the sheet.

3. A pad for use in permanent hair waving comprising an outer paper sheet, a layer of hair treating material secured along one edge to the paper layer and otherwise free to swing away from the same whereby the layer may be wetted without wetting the paper layer and absorbent means carried by the paper layer adapted to engage one edge of the hair treating layer for absorbing any drop from the same when the pad is in use.

4. A pad for use in permanent hair waving comprising a base layer, a layer of hair treating material secured thereto and adapted to be wetted and a layer of absorbent material secured to the base layer and adapted to catch drip from the wet layer when the pad is in use.

5. A pad for use in hair waving comprising a layer of paper, a pad element carried by the paper layer and adapted to be swung away from the same to permit wetting of the pad element without wetting the paper and a layer of absorbent material secured to the paper at one edge thereof and adapted to be held therewith out of contact with the pad element while the same is being wetted.

6. A pad for use in hair waving comprising a layer of paper, a pad element carried by the paper layer and adapted to be swung away from the same to permit wetting of the pad element without wetting the paper.

7. An article of manufacture constituting a flat flexible pad adapted to be wrapped about a coil of hair in the process of waving the hair, and comprising a layer of chemically treated material adapted to be wetted when prepared for use, and a strip of flexible absorbent material for preventing drip from the pad while in use, said layer and strip being separable before the pad is applied to the hair whereby the strip of absorbent material may be temporarily removed from the chemically treated layer while the latter is being wetted.

8. A pad for use in waving hair including means adapted to be wetted, absorbent means for preventing drip from said pad while in use and means for securing said first two mentioned means to each other.

9. A pad for use in permanent hair waving comprising a layer of paper, a pad of absorbent material hingedly secured along one edge portion to the paper layer and the free edge portion of said pad in spaced relation to said hingedly secured edge portion being movable relative to the paper layer whereby opposite sides of the pad may be exposed for wetting the same without wetting the paper, and said paper and pad adapted to be disposed in folded relation with the wetted pad contacting with the unwetted paper layer.

Signed at New York in the county of New York and State of New York, this 22nd day of December, A. D. 1928.

HOWARD W. CARLOUGH.